(12) United States Patent
Oh et al.

(10) Patent No.: US 6,217,918 B1
(45) Date of Patent: Apr. 17, 2001

(54) MICROWAVABLE PASTA IN A BOWL

(75) Inventors: Nam H. Oh, Warren; Silverio Luiz Tecedor, Harrington Park; Richard F. Schryer, High Bridge; Edward J. Meyers, Roselle Park; M. Magdy Hefnawy, Randolph; Harry A. Rubbright, Mendota Heights; Nelson J. Beall, St. Michael; Stephen A. Gaeta, Flemington; M. Debbie Meiners, Somerville, all of NJ (US)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/215,012

(22) Filed: Dec. 17, 1998

Related U.S. Application Data (63) Continuation-in-part of application No. 09/200,274, filed on Nov. 24, 1998, and a continuation-in-part of application No. 09/165,080, filed on Oct. 2, 1998, and a continuation-in-part of application No. 09/084,140, filed on May 26, 1998, now Pat. No. 6,106,882, and a continuation-in-part of application No. 09/074,714, filed on May 8, 1998, now abandoned.

(51) Int. Cl.[7] ................................... A23L 1/162
(52) U.S. Cl. ................ 426/89; 426/589; 426/557; 426/451; 426/94; 426/241; 426/243; 219/10
(58) Field of Search ................ 426/89, 589, 557, 426/451, 94, 241, 243; 219/10

(56) References Cited

U.S. PATENT DOCUMENTS

| | | | |
|---|---|---|---|
| D. 192,485 | 3/1962 | Eicholtz | 11/58 |
| D. 193,118 | 6/1962 | Bostrom | 11/58 |
| D. 193,586 | 9/1962 | Eicholtz | 17/58 |
| D. 204,212 | 3/1966 | Davis | 17/58 |
| D. 231,085 | 4/1974 | Edwards | 3/9 |
| D. 239,999 | 5/1976 | Christian | 1/7 |
| D. 241,399 | 9/1976 | Christian | 1/7 |
| D. 279,168 | 6/1985 | Goldsmith | 429/9 |
| D. 310,464 | 9/1990 | Laib | 615/7 |
| D. 323,097 | 1/1992 | Picozza | 538/7 |
| D. 337,051 | 7/1993 | Harbeke | 424/9 |
| 3,987,207 | 10/1976 | Spaeti et al. | 426/19 |
| 4,539,214 * | 9/1985 | Winter et al. | 426/557 |
| 4,693,900 | 9/1987 | Molinari | 128/426 |
| 4,704,510 * | 11/1987 | Matsui | 219/10.55 |
| 4,797,288 | 1/1989 | Sharma et al. | 424/474 |
| 5,077,066 | 12/1991 | Mattson et al. | 421/234 |
| 5,128,166 | 7/1992 | Babines et al. | 557/426 |
| 5,258,196 | 11/1993 | Lohan et al. | 560/426 |
| 5,305,911 | 4/1994 | Aylward | 675/220 |
| 5,356,642 | 10/1994 | Patterson et al. | 242/426 |
| 5,393,543 | 2/1995 | Laufer | 549/426 |
| 5,397,586 | 3/1995 | Furcsik | 549/426 |
| 5,414,248 | 5/1995 | Phillips | 730/219 |
| 5,416,304 | 5/1995 | De la Cruz et al. | 730/219 |
| 5,416,305 | 5/1995 | Tambellini | 730/219 |
| 5,427,741 | 6/1995 | Bennett | 102/422 |
| 5,436,015 | 7/1995 | Patterson et al. | 94/426 |
| 5,451,418 | 9/1995 | Gusek | 555/426 |
| 5,460,839 | 10/1995 | Archibald | 107/426 |
| 5,483,044 | 1/1996 | Thorneywork et al. | 681/219 |
| 5,491,323 | 2/1996 | Mori et al. | 710/219 |
| 5,492,711 | 2/1996 | Stengel | 557/426 |
| 5,510,132 | 4/1996 | Gallo, Jr. | 234/426 |
| 5,519,195 | 5/1996 | Keefer et al. | 728/219 |
| 5,527,413 | 6/1996 | Perry et al. | 229/156 |
| 5,539,187 | 7/1996 | Smith et al. | 681/219 |
| 5,541,390 | 7/1996 | Pinceloup | 701/219 |
| 5,548,101 | 8/1996 | Lee | 601/219 |
| 5,582,854 | 12/1996 | Nosaka et al. | 234/426 |
| 5,588,587 | 12/1996 | Stier et al. | 232/229 |
| 5,589,093 | 12/1996 | Chen | 679/219 |
| 5,593,610 | 1/1997 | Minerich et al. | 728/219 |

FOREIGN PATENT DOCUMENTS

| | | |
|---|---|---|
| 0 824 000 | 2/1998 | (EP) . |
| 1 254 562 | 11/1971 | (GB) . |
| WO 95/05751 | 2/1995 | (WO) . |

OTHER PUBLICATIONS

European Search Report EP 99 10 8580.
Japanese Abstract XP–002141356.
"Flavor Encapsulation", Chapter 17 by Jones, pp. 158–176.

* cited by examiner

*Primary Examiner*—Keith Hendricks
*Assistant Examiner*—Philip DuBois
(74) *Attorney, Agent, or Firm*—Norris, McLaughlin & Marcus

(57) ABSTRACT

A convenience food product comprising a microwavable pasta packaged in a container which facilitates even cooking in a microwave oven. The product can further comprise an improved hydratable sauce in the form of granules which tend not to form clumps upon the addition of water or milk and requires minimal stirring.

22 Claims, 6 Drawing Sheets

MICROWAVABLE PASTA IN A BOWL

CROSS-REFERENCE TO RELATED APPLICATIONS

This application is a continuation-in-part of Ser. No. 09/074,714, filed May 8, 1998 now abandoned, Ser. No. 09/084,140, filed May 26, 1998 now U.S. Pat. No. 6,106,882 and Ser. No. 09/165,080, filed Oct. 2, 1998, which is a CIP Ser. No. 09/200,274 filed Nov. 24, 1998, the disclosures of which are incorporated herein by reference.

BACKGROUND OF THE INVENTION

1. Field of the Invention

The present invention has to do with a convenience food product comprising a microwavable pasta packaged in a container which provides an evenly cooked product in a microwave oven. In a preferred embodiment, the product further comprises an improved hydratable sauce which tends not to form clumps when water or milk is added and requires minimal stirring.

2. Description of Related Art

Microwave cooking is frequently associated with uneven heating and boiling over of liquid contents. One of the ways of minimizing these problems is to cook for a brieftime, stir, cook again, stir again, and so forth until the cooking is complete. Consumer preference, however, is to cook the product once and remove it from the microwave oven in a condition that is ready to eat.

Presently available instant or quick cooking pasta and noodles (pasta products) are associated with inferior texture and hydration characteristics. Most of these products are made by extrusion cooking or cooking subsequent to extrusion by immersion in boiling water and/or steam cooking. Extrusion cooking, however, results in deterioration of the pasta texture due to the impact of heat and high shear on the protein matrix prior to and during extrusion. When these products are rehydrated, the texture mushy or soft, not "al dente". The extrusion cooking process also is costly, requiring sophisticated equipment and control systems. The pasta component of the present invention can be manufactured utilizing less sophisticated, more readily available equipment.

U.S. Pat. No. 3,251,694 describes a pre-cooked macaroni wherein the dough is made in a conventional manner and the fresh pasta is completely pre-cooked and dried at 300–700° F. for about 3 to 9 minutes. The product, however, is expensive because of high processing costs and is limited to pasta shapes that can be extruded with thin walls and still maintain their shape.

According to U.S. Pat. No. 3,615,677, a rapid cooking pasta is made by extruding the dough and drying to a moisture content of less than 12% either with humidified air for 12–48 hours or at a temperature from about 150–300 ° F. for about 5–120 minutes to at least partially gelatinize the starch. Corn flour in an amount from about 45–85% is a critical ingredient because it serves as a binder and it masks the harsh bitter flavor of soy materials. (Another critical ingredient is soy flour in an amount of 15–40%). The specification provides that for high temperature drying the gelatinization of the starch can be effected prior to, during, or after extrusion and that gelatinization should be at least about 10%, with best results at about 10–75%. The product, however, has poor structural integrity, a soft mushy structure and the harsh bitter flavor of soy material is not effectively masked.

Several other patents describe pasta products which can be rehydrated quickly but they require complete pre-cooking during the manufacturing process. These include U.S. Pat. No. 2,704,723 wherein the fresh pasta is immersed in boiling water before drying, and U.S. Pat. Nos. 4,044,165, 4,394, 397 and 4,540,592 wherein combinations of heat and mechanical stress are used during extrusion processes to fully pre-cook the pasta products. All of these products suffer from poor textural qualities and lack of "al dente" texture.

A method of coating pasta for providing a firm texture is described in U.S. Pat. No. 5,144,727. The coating composition is a dried coagulated egg white and an edible oil.

Presently available hydratable food products require stirring when water or milk is added in order to disperse the dry particles in the liquid before cooking and stirring also is required during cooking. For example, in a microwave application the product must be removed from the oven and stirred thoroughly at least once before it is completely cooked. Then is stirred again following cooking.

When thick food products such as hydrated sauces are cooked with other ingredients, the thickening agents, starches, gums and the like, usually cause lumps unless vigorous stirring is applied during cooking. This problem is more manifested if the hydrated sauces are prepared with carbohydrate ingredients such as pasta, potatoes or rice. These problems are substantially minimized when sauces according to the present invention are employed.

The present invention overcomes the problems associated with the prior art by providing a microwave container having a combination of geometric features which enhance the efficiency and uniformity of microwave cooking by taking into account the dielectric properties of the liquid food products being cooked and the geometry of the container in relation to the microwave wavelength. The design also causes the liquid contents to cook with boiling while preventing boil over.

The drawbacks of previously known methods and products are also overcome by the new pasta manufacturing method of the present invention and the new pasta products produced thereby. We have now discovered a method of drying freshly extruded pasta by toasting (i.e. using heated ambient air without added moisture) pasta under controlled conditions to prepare a product having excellent appearance and texture with superior cooked yield and short cook times.

The method of making the pasta products of the invention has lower initial capital equipment requirements and lower ongoing manufacturing cost attributed to shorter drying times. The invention also permits manipulation of the processing conditions to obtain a wide range of pasta densities and textures from soft to firm. Accordingly, the pasta products of the invention can be made to have the "al dente" texture of conventional pasta or a softer or firmer texture if desired.

All percentages and ratios set forth herein are by weight/weight unless designated otherwise. All percentages of ingredients used in recipes to prepare the pasta products of the invention are based on the total weight of ingredients prior to the addition of water to make the dough.

SUMMARY OF THE INVENTION

The container of the invention is in the form of a bowl having a bottom portion and a side panel and the bowl is dimensioned to preclude the establishment of a resonance (standing wave) which would result in an unpredictable microwave heating, by having a base in the shape of a torus with a diameter large enough to minimize or preclude internal resonance in a liquid-containing food. The diameter also is small enough to permit effective microwave cooking of the contents.

The bottom portion of the bowl comprises a central segment and an outer segment with the central segment being in the form of a push-up in the shape of a section of a sphere. The push-up extends to a bottom panel along a first bottom radius and the bottom panel extends to the side panel along one or more than one additional bottom radii (i.e., at least a second bottom radius). Accordingly, the outer segment is comprised of the first bottom radius, the bottom panel and one or more than one additional bottom radii. In one embodiment, the first bottom radius and the one additional bottom radius (i.e., the second bottom radius) are the same and the radius extends continuously from the push-up to the side panel forming a curved bottom panel.

The side panel is tapered outwardly from the bottom as it extends toward an opening at the top of the bowl and a rim is provided at the top in the form of a flange with a rolled outer edge to provide a surface for adhering a lid and to add structural strength.

Externally at the bottom of the bowl a bottom rib is optionally provided to raise the bowl slightly off the shelf of the microwave oven so that heat loss from the bowl to the shelf of the oven is minimized.

The bowl can be disposable or reusable and is produced by conventional processing techniques for molding of any suitable plastic material, for example, injection molding, thermoforming and the like.

The toasted pasta products of the present invention have improved product texture and appearance and can be rehydrated quickly by microwave cooking, adding hot or boiling water or by conventional stove top preparation. The products are partially pre-cooked, having a degree of gelatinization from about 15% to about 80%, preferably from about 25% to about 75%. The products also have a moisture content of less than about 13%, i.e. from about 2% to about 13%, and have the appearance (size and shape) of regular dry pasta even when they are extruded from thin wall dies. The products have a low density, from about 0.600 to about 1.05 grams/cubic centimeter("g/cc"), preferably from about 0.75–1.05 g/cc and this contrasts with prior art pastas which have densities greater than about 1.3 g/cc. The products also have a stabilized pasta matrix wherein the starch is partially gelatinized and protein is partially denatured in such a way as to produce a porous internal structure that is unique in the art. Scanning electron micrographs reveal an open "sponge like" structure where products produced with prior art technologies yield a dense compact structure. The structure of the products of the invention is also believed to be responsible for the superior cooked yields which are from about 315% to about 450%, preferably from about 330% to about 425%.

The manufacturing process for making the pasta of the invention is carried out by toasting freshly extruded or sheeted pasta at a temperature from about 180° F. to about 350° F. for from about 1 to about 25 minutes, preferably at from about 210° F. to about 310° F. for from about 2 to about 15 minutes. Toasting can be conducted in more than one zone and a heating with steaming step can be used just prior to the first toasting zone. When heating with steaming is used, the temperature in that step must be at least 212° F. to cause expansion of the pasta and it can be as high as about 350° F. When there is no heating with steaming step, the minimum temperature in the first (or only) toasting zone also must be 212° F. to cause expansion of the pasta.

The freshly extruded or sheeted pasta has a moisture content from about 15% (semi-moist) to about 35% (wet/moist) before toasting. It is a theory of the invention that higher dough moisture levels facilitate the expansion of the protein starch matrix before it is stabilized by partial denaturation of the protein and partial gelatinization of the starch. Increased dough moisture produces more steam vapor or leavening effect, resulting in pasta with a more porous, less dense structure. This structure is fixed by heat that, along with higher moisture content in the early stages of toasting, acts to denature protein and to increase the rate of starch gelatinization.

The granular food product of the invention is hydratable to make sauces, soups or similar food products. The product is in the form of granules wherein more than about 90%, preferably more than about 98% have a particle size from about 1000 microns to about 175 microns (i.e. from about 18 to about 80 mesh based on the United States Standard [ASTME 11-61] ("USS") sieve system). In other words, more than about 90%, preferably more than about 98%, pass through an 18 mesh sieve and are retained on an 80 mesh sieve.

The granules are both hydrophilic and hydrophobic. The hydrophobic characteristic causes the particles to disperse when water or milk is added but it does not prevent the absorption of the water or milk because the particles also retain their hydrophilic character. This is contrasted with prior art hydrophilic dry mixes which absorb water rapidly and form clumps which must be physically dispersed by agitation or mixing.

Various ingredients can be employed to make the granular product depending upon the desired flavor and end use. An essential ingredient, however, is an emulsifier such as lecithin, mono or diglycerides or other food grade emulsifiers which are capable of imparting hydrophilic characteristics to the granules. Accordingly, the granular product of the invention can contain from about 2% to about 55%, preferably from about 18% to about 35%, fat or fat substitutes or a combination thereof. Other ingredients can include crystalline ingredients such as sugar, salt, citric acid and substitutes therefor; dairy ingredients such as dry milk, cheeses, cream powders and the like; spices, natural and artificial flavors, and thickening agents such as starches (native, modified, waxy, etc.) and vegetable gums.

As a first step, all of the ingredients, except for the heat sensitive ingredients and binders, are mixed in a high shear or fluid bed mixer to make a dry mixture. The dry mixture then is heated to the melting point of the fat component or up to about 3° C. above the melting point, and then it is coated with a first binder composition to make a first particulate composition. The first binder composition is applied by spraying during mixing using conventional means such as a high shear mixer or a fluidized bed. Spraying is conducted through a conventional nozzle. The size of the nozzle orifices will determine the size of the droplets and, accordingly, product particle size. The temperature in the fluidized bed is maintained at from about 20° C. to about 50° C.

The first binder composition is water or an aqueous solution which can contain as ingredients from about 0% to about 35% of soluble starch, 5–20 D.E. maltodextrin, dextrose, sugar (sucrose) or salt or any combination of two or more than two of such ingredients.

Following the formation of particulates with the first binder, the first particulate composition is dried to a moisture content of from about 2% to about 6% at a temperature from about 35° C. to about 60° C. using fluidized drying or drying under a vacuum to make a dried first particulate composition.

The dried first particulate composition is cooled using cool air or a cold jacketed mixer to ambient temperature or from about 15° C. to about 40°C. and then the heat sensitive ingredients such as natural and artificial flavors, spices and protein compounds (e.g., albumin, globulin, egg protein or whey protein concentrate) are added and mixed therewith for from about 1 to 3 minutes using a fluid bed, impeller/chopper or similar mixer. Following mixing, a second binder is applied in the same manner as the first binder. The second binder is comprised of: (1) the emulsifier and, (2) an oil and/or another first binder composition.

After the particles are coated with the second binder, they are a hydratable granular product ready for use to make a sauce according to the invention. The granular product is hydrated along with the pasta of the invention by adding milk or water, gently stirring, heating to cook and hydrate and then gently stirring again before eating.

Microwave preparation methods are used in conjunction with this invention to achieve fast hydration and completion of the cooking process (further protein denaturation and starch gelatinization).

The convenience food product of the invention contains at least one serving of pasta and can contain several servings. For one serving, the serving size can be up to about 75 grams of dry (not rehydrated) pasta and, generally it will be from about 45 to about 75 grams, preferably from about 55 to about 65 grams of dry pasta. Of course, larger servings can be made to accommodate two or more consumers and small servings can be made as a snack or side dish.

BRIEF DESCRIPTION OF THE DRAWINGS

Scanning electron microscopy was used to make photomicrographs of cross-sections of the pasta of the invention and previously known pastas. Photomicrographs were obtained using secondary electrons at a magnification of 35 times normal at 10,000 volts. Pieces of pasta were snapped in half by hand to obtain cross-sectional fractures. About ¼ inch below the fracture, each piece was cut with a scalpel to provide a flat surface for mounting on an aluminum stub that fits within the scanning electron microscope ("SEM"). Each mounted sample was gold coated in a sputter coater and then transferred to the SEM chamber.

DETAILED DESCRIPTION OF THE INVENTION

Figure 1:
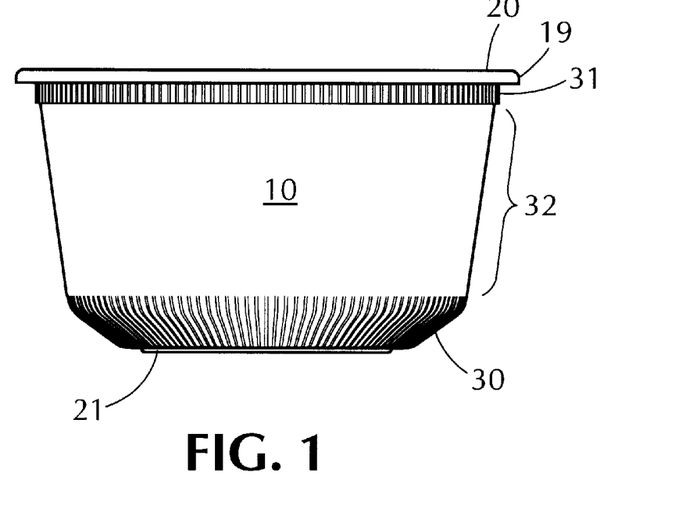
FIG. 1 is a side elevational view of the bowl of the invention.
Figure 2:
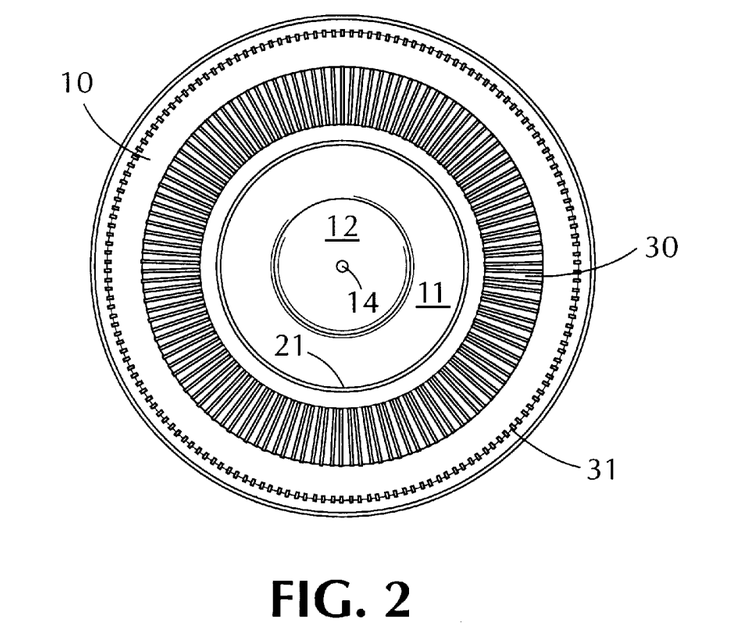
FIG. 2 is a bottom elevational view of the bowl of the invention.
Figure 3:
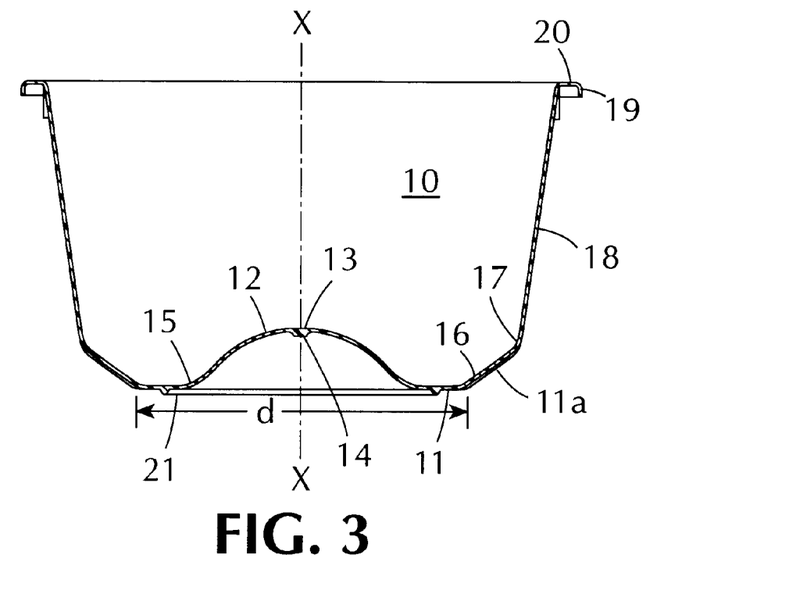
FIG. 3 is a section view of the bowl of the invention.

A preferred embodiment of a container of the invention in the form of a bowl 10 is illustrated in FIGS. 1–3. Bowl 10 is comprised of a generally circular bottom portion which comprises a push-up 12 having an apex 13 on the central axis X—X of the bowl. (Sprue 14 may be left at the apex 13 on the underside of the push-up 12 if the bowl is manufactured using an injection molding process.)

Push-up 12 comprises a section of a sphere. The push-up increases the surface area of the bowl adjacent to the contained food so that the probability of microwaves entering the bowl and heating the food is increased. Bottom panel 11 extends to push-up 12 along first bottom radius 15 which is smooth and without sharp edges because sharp edges within the bowl can cause uneven cooking and they can contribute to boiling over. Smooth radii, in contrast to sharp edges, facilitate the movement of liquid as it heats. Bottom panel 11 also extends along second and third bottom radii 16 and 17, having a substantially frusto-conical portion 11a therebetween, said frusto-conical portion having a smooth surface on the inside of the bowl and a plurality of lower ribs 30 radially disposed on the outside of the bowl. Lower ribs 30 can extend beyond frusto-conical portion 11a as illustrated in FIG. 1 wherein they extend over the exterior of radii 16 and 17. The smooth inside surface of frusto-conical portion 11a and radii 16 and 17 are without sharp edges for the same reasons as explained above. Lower ribs 30 provide an area on the outside of the bowl which can be handled when the bowl is hot with reduced transfer of heat to the consumer's hands.

Portion 11a extends along radius 17 to side panel 18 and side panel 18 tapers outwardly away from axis X—X, as it extends from the bottom portion toward an end opening defined by rim 19. The taper of the side panel has a sufficient slope to release the steam which will be convected up the inside walls during cooking. The outer segment of the bottom portion also has a doughnut-like shape which assists in this convection by having a lower temperature than the area about the push-up. The shape of the bottom of the bowl also provides an area in which dry ingredients can collect. With the addition of water, the ingredients rehydrate in a concentrated area and rehydrate faster.

Figure 4:
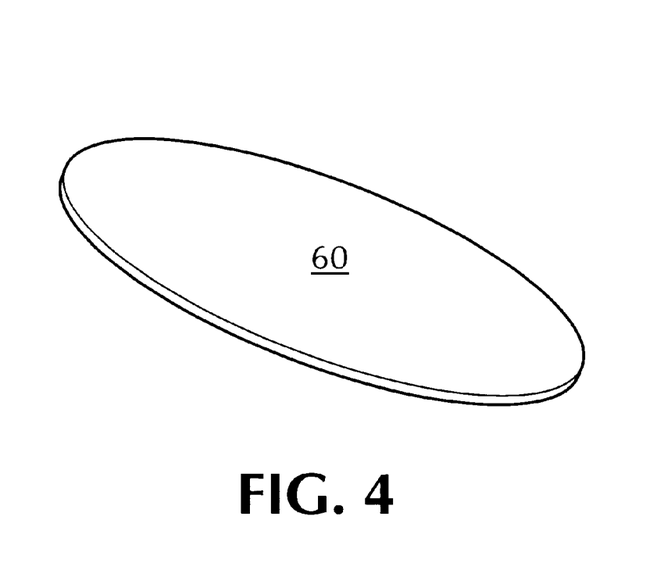
FIG. 4 is a perspective view of a lid for the bowl.

Rim 19 has a flat portion 20 which substantially lies in a plane normal to axis X—X and which facilitates sealing a lid 60 (FIG. 4) on top of the bowl 10. Conventional lid materials and sealing adhesives can be employed as will be apparent to those skilled in the art. The rim 19 has a rolled outer edge to provide strength so that the consumer can lift the bowl 10 using the rim, particularly after cooking when the bowl may be somewhat softened from heating. Upper ribs 31 are radially disposed on the exterior of the side panel of the bowl and extend downwardly from rim 19 to provide an area on the exterior of the bowl which can be handled when the bowl is hot with reduced transfer of heat to the consumer's hand. The upper ribs 31 are sufficiently spaced from lower ribs 30 to provide an area 32 for labeling.

Figure 5:
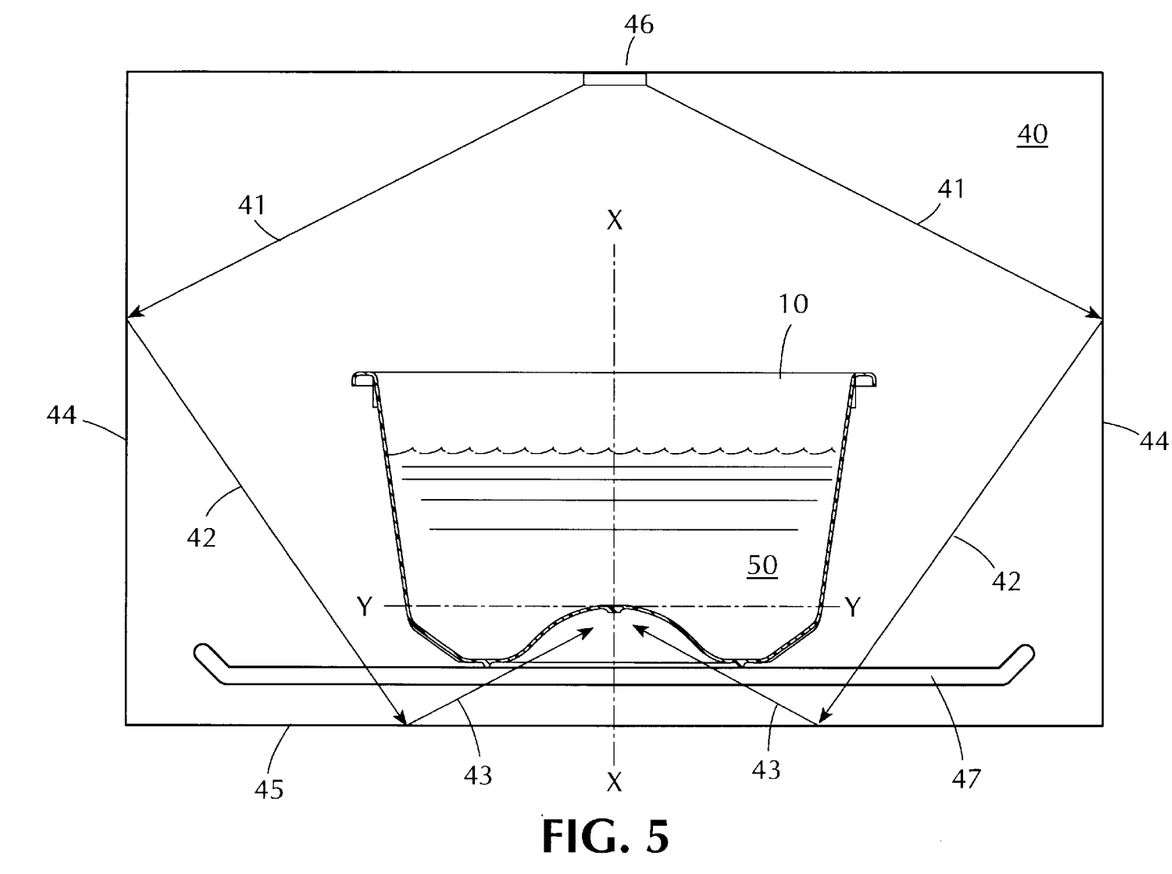
FIG. 5 is a section/schematic view illustrating the bowl of the invention in a microwave oven.

Optional bottom rib 21 is disposed on the underside of bottom panel 11 to raise bowl 10 slightly off the shelf 47 of the microwave oven 40, thereby reducing the transfer of heat from the bowl to the shelf by providing air insulation.

Figure 6:
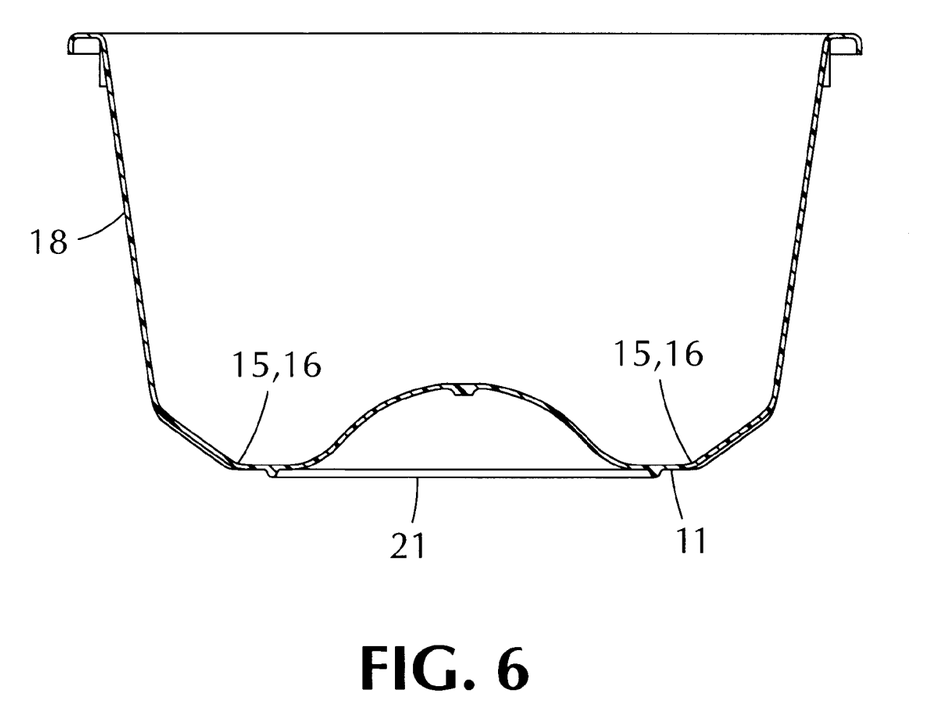
FIG. 6 is a section view of a bowl of the invention having a curved bottom panel.

FIG. 6 illustrates an embodiment of the invention having a curved bottom panel 11. In this embodiment, radii 15, 16 can be the same or different and when they are different the curve can be in the shape of an ellipse. Other than the shape of the bottom, this embodiment can have all of the features of the aforesaid embodiment. For example, lower ribs can be radially disposed on a portion of the exterior of the bottom panel extending downwardly from the side panel toward a low point (i.e., the perigee or point of contact) of the bottom panel.

In microwave ovens, energy enters into an oven cavity through a feed slot. The slot can be on the top, bottom or side, and energy is reflected off the walls and bottom of the oven and into the product being heated. When a conventional bowl is placed in a microwave oven, a minimum amount of energy is reflected from the bottom of the oven into the bowl because the bowl bottom is relatively small in area and the shelf is only raised off the bottom by a short distance.

According to the present invention, the spherical section (push-up 12) increases the overall exposed area of the bottom portion of the bowl, providing greater area for microwave energy to enter the bottom of the bowl. Push-up 12 also reduces the thickness of the product to be heated in the center.

The geometry of the bowl causes the portion of the contents which fill the section below a plane normal to axis X—X and intersecting push-up 12 at apex 13 (plane Y—Y in FIG. 5) to be cooler than the contents above the push-up 12 and thereby promotes convective rotation of the liquid-containing contents. The slanted walls of the bowl and the radius in the bottom of the bowl, below plane Y—Y permit the dissipation of the pressure that builds up from boiling, which is created by the amount of energy induced into the bowl. With a wider top diameter than the bottom, the less vigorously the product will boil and this helps to avoid bumping. (Bumping is a build up of pressure in a region of a liquid that becomes superheated and then explodes causing the container to jump and produce a thumping or bumping sound. Vertical bowl or cup walls prevent the gradual release of pressure and tend to bump more frequently.)

FIG. 5 illustrates a microwave oven having a feed slot at the top and shows how microwave energy can be directed into and through the bottom of the cooking container. When bowl 10 is placed on shelf 47 in microwave oven 40 to cook the contents 50, microwave energy enters the oven from feed slot 46 and some of the energy is emitted in the direction of arrows 41. This energy is reflected off walls 44 in the direction of arrows 42 and is again reflected off bottom 45 in the direction of arrows 43. Accordingly, energy is ultimately directed into and through the spherical section of push-up 12 to heat contents 50. When contents 50 are sufficiently heated, the geometry of the bowl causes controlled boiling to occur without boil over. The controlled boil is achieved by the uniform distribution of heat, the lack of sharp corners within the bowl and the tapered sides 18. Bumping is accordingly avoided and the risk of boil over is minimized.

Geometrically, when viewed from the bottom, the bowl of the invention has a torus (doughnut) shape. The effective circumference of the torus should be greater than a whole number of half wavelengths in order to avoid or minimize the occurrence of so called ring-resonance. Accordingly, in conventional microwave ovens which operate at a frequency of about 2,450 megahertz (MHz), the resonance lengths to be avoided in terms of effective diameter of the torus are about 60, 120 and 180 mm. (Since there is some wave penetration into a dielectric, its "microwave diameter" becomes slightly less than its geometrical diameter.) The effective diameter of the torus, therefore, must be large enough to have an antiresonant effect. For conventional microwave ovens, the effective diameter must be greater than 60 mm, preferably greater than about 65 mm, so that the effective circumference of the torus (at the effective diameter) becomes antiresonant. (If a microwave oven operated at a frequency different from about 2,450 MHz, the effective diameter would be adjusted accordingly, as would be apparent to one skilled in the art.) As a practical matter, for efficient microwave heating, the effective diameter of the torus also should be less than about 100 mm.

A torus has a centerline diameter and a body diameter. For definitional purposes in the present specification, the effective diameter is measured at the outer line of contact of the bowl with the shelf of the microwave oven when the contents of the bowl include a substantial amount of water. (Effective diameter is measured at this line when the contents of the bowl are products containing liquid as defined herein and this is based on the dielectrics of the water, a load with a high dielectric constant. As the load becomes dryer, the effective diameter is measured at a higher line (away from the bottom panel and toward the end opening) defined by a plane normal to the X-axis which intersects the outer diameter of the torus. Accordingly, for a semi-dry load (i.e., a lower dielectric constant load) the effective diameter could be measured at the average radius of curvature.) When an optional bottom rib 21 is disposed on the underside of bottom panel 11, however, the rib is not considered as defining the line of contact for purposes of measuring the effective diameter. Accordingly, the effective diameter is measured at the place where the outer line of contact would be in the absence of bottom rib 21.

The effective diameter of the torus of the bowl of the present invention is the distance d illustrated in FIG. 3 for products containing liquid. The bowl of the invention accordingly has a torus with an effective diameter sufficiently large to have an antiresonant effect. In the preferred embodiment of the invention, the diameter of the torus is more than 60mm, preferably more than about 65 mm, and less than about 100 mm.

The bowl can be manufactured using any food grade materials which can withstand the temperature of boiling water. Various polymers and polymer blends are suitable and they can include polyethylene terephthalate, polycarbonate, polyacrylonitrile, nylons, glass, polypropylene and polyethylene. A preferred material used to make the bowl is polypropylene and this can have high density polyethylene mixed therein to increase resistance to impact breakage at low temperatures.

The microwavable pasta product of the invention can be manufactured using conventional ingredients. A pasta dough is made with wheat flour and water and, optionally, with other conventional ingredients using known processing techniques such as extrusion or sheeting. Accordingly, the ingredients are combined and hydrated with sufficient water to attain the desired consistency and kneaded to make the dough. The dough can be formed into the desired shape by extrusion through a die plate or by sheeting and then it is cut into pieces of the desired size.

The ingredients of the pasta of the invention comprise wheat flour selected from the group consisting of semolina, farina, durum, hard wheat and soft wheat flours and pasta regrind from wheat based pastas and the like. Alternate flours such as those from rice and corn can be employed in amount from 0% to about 15% and preferably less then about 10%. Starches from sources such as rice, corn or potato also can be employed in amounts from 0% to about 20%, preferably less then about 15%. Protein sources can be optionally added in amounts from 0% to about 10% and when they are used they typically are added in amounts of at least about 0.5%. Typical protein sources include wheat gluten, milk protein, soy protein and eggs in any form including whole eggs, egg whites, powdered eggs, powdered egg whites and the like. A variety of natural and artificial flavors, herbs, spices, cheeses and the like also can be employed in amounts from 0% to about 15% and when they are employed they typically are added in amounts of at least about 0.1%.

Traditional vacuum levels for pasta dough extrusion are about 22 inches mercury (Hg). According to the present invention, however, extrusion is conducted at ambient pressure levels (no vacuum) or at low vacuum, i.e. less than about 12 inches Hg. When vacuum is employed, the vacuum is maintained in the mixing chamber and screw conveying chambers of the extruder. The ambient extrusion without vacuum or with low levels of vacuum causes the extruded dough to be produced with many evenly distributed fine air cells. These air cells act as nucleation sites for air expansion and, more importantly, for moisture vapor to collect and expand to create a porous matrix during toasting. Using a full vacuum (i.e. traditional levels) according to the process of the invention produces a product having an uneven internal structure and an uneven external appearance.

The expanded cell structure is responsible for a porous pasta product (pasta or noodle) structure that creates an attractive product (having the appearance of regular pasta) and insures faster hydration during preparation by microwave, hot or boiling water pour over preparation or conventional stove top preparation.

In practice we have found that the moisture content of extruded pasta products before toasting can be varied from about 15% (semi-moist) to about 35% (wet/moist). Moisture content at the higher end of the range is preferred when a faster rehydration time is desired. This is attributed in part to a slightly higher degree of starch gelatinization (cooking) that occurs when more moisture is available during toasting. Increased moisture also increases the expansion of the protein-starch matrix during toasting to create a "sponge like" structure that is also responsible for the short cook times achieved by this invention.

Figure 7:
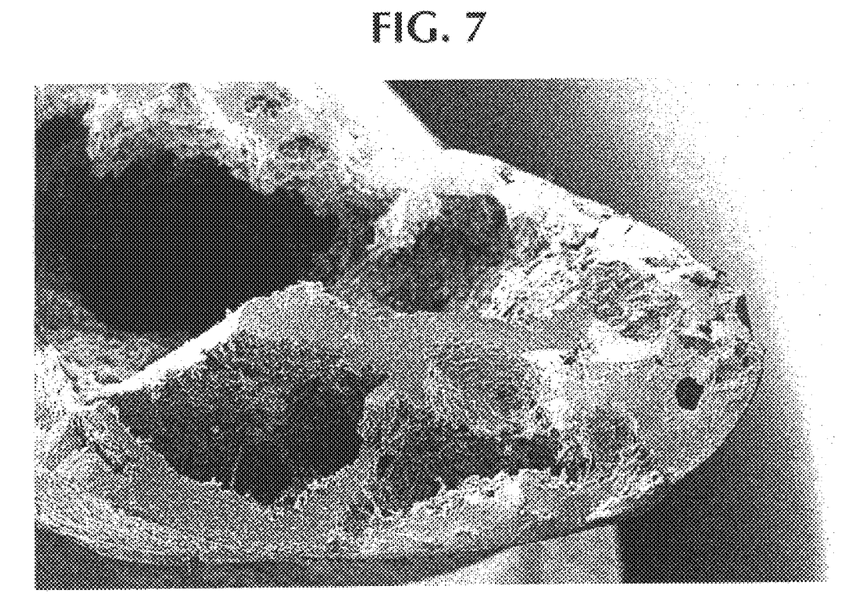
FIG. 7 is a SEM photomicrograph of a pasta of the present invention made according to Example 10 herein.

In one example, pasta produced by this invention decreased hydration time versus conventional pasta by 3 minutes and eliminated the starchy, uncooked texture and flavor associated with the undercooked conventional pasta being used as a comparison. Overall, the decreased cook times of this invention are the result of the partial cook (partial gelatinization) of the starch and, more importantly, the result of the open "sponge-like" character of the protein-starch matrix as illustrated in FIG. 7. This structure provides channels for hot water to penetrate rapidly, hydrate and cook the pasta.

For the pasta product of the present invention, control of density and texture is directly linked to the control of the toasting conditions employed and the moisture content of the pasta dough. It has been found that higher toasting temperature in first and subsequent toasting zones increases pasta porosity and decreases pasta density. For example, toasting at temperatures from about 180° F. up to about 325° F. caused the pasta density to continue to decrease. However, when the temperature was held at 325° F. or higher for too long, an increase in pasta density was observed, indicating a partial collapse in the protein starch matrix. These data are illustrated in Table I. This collapse was apparently the result of overextending or stressing the protein starch matrix.

TABLE I

| Test # | Zone 1 ° F. | Zone 2 ° F. | Density (g/cc) |
| --- | --- | --- | --- |
| 3 | 276 | 325 | 0.802 |
| 7 | 276 | 325 | 0.815 |
| 4 | 325 | 325 | 0.832 |
| 8 | 325 | 325 | 0.825 |

According to the present invention, freshly mixed pasta dough at a moisture content of from about 15% to about 35% moisture, preferably from about 26% to about 33% moisture, is extruded or sheeted to form the desired thin or thick walled pasta. The moist pasta is then cut to the desired size and the pieces are processed by toasting at a temperature from about 180° F. to about 350°F. for from about 1 to about 25 minutes. The preferred processing temperature range is from about 210° F. to about 310°° F. for from about 2 to about 15 minutes to attain a moisture content of less than about 13%, i.e., from about 2% to about 13%, preferably from about 5% to about 12%. Toasting can be conducted in more than one zone and a heating with steaming step can be used just prior to the first toasting zone. When heating with steaming is used, the temperature in that step must be at least 212° F. to cause expansion of the pasta and it can be as high as about 350° F. When there is no heating with steaming step, the minimum temperature in the first (or only) toasting zone also must be 212° F. to cause expansion of the pasta.

In a preferred embodiment of the invention, toasting is conducted in two or more toasting zones as mentioned above. Additionally, the optional step of heating and steaming the pasta just prior to toasting can be used further to partially cook the pasta and set the pasta surface. The preferred toasting time and temperature is varied depending upon pasta shape, thickness, and the texture desired. Thicker moist pasta will require longer toasting times and/or higher temperatures.

The degree of expansion and resulting pasta product density can be manipulated to deliver the desired texture, hydration and cook time. A significant advantage of this invention is in the ability to control the pasta thickness and the degree of porosity/density needed to obtain the desired preparation time and texture. Product density is controlled so that the product will have a density from about 0.600 to about 1.050 g/cc. The preferred range of density is generally from about 0.700 to 1.000 g/cc. In practice the preferred range of density is dependent on the specific application for which the pasta will be used. Control of product density is one of the distinguishing characteristics of this invention. Furthermore, the density of the pasta produced by this invention sets it apart from the higher density, more than about 1.3 g/cc, of commercially available precooked pasta and conventionally produced pasta.

Density determinations were made according to the invention using silicone oil according to the following procedure. An 8 ounce jar was preweighed on a top loading balance sensitive to 0.01 grams and precalibrated for volume using Silicone Oil (Fisher Scientific Cat. No. S159-500). 25.0+/−0.5 grams of pasta was accurately weighed into the jar and enough Silicone Oil at 23 ° C. temperature was added to just cover the pasta. A thin metal spatula was used to stir the mass to release any trapped air. Addition of Silicone Oil was resumed until the oil was almost to the rim of the jar. A preweighed flat 4 and ½ inch square, ⅛ inch thick plastic plate containing 24, 1/16 inch holes and one center ¼ inch hole within the area of the top of the jar was placed on top of the jar. It was positioned so that the large hole in the center was close to the center of the jar opening. Silicone Oil was again added with a pipette into the center hole until all air was excluded from beneath the plate.

The density of the silicone oil at 23° C. of 0.961 g/cc was divided into the weight required to fill the empty jar to establish the jar volume and separately into the weight of the oil added to fill the jar when it contained the pasta, to establish the volume of the pasta by difference. After the pasta weight was adjusted for its moisture content to obtain the weight on a dry basis, the pasta weight was divided by the determined pasta volume to obtain the pasta density.

Density control according to the invention is achieved by the controlling the toasting time and temperature in the toasting zone, and preferably in two or more separate toasting zones. Control of the extrusion process (moisture content and vacuum level) and the toasting process (toaster residence time and toasting temperature) will control the product density.

In the first toasting zone, and to a lesser degree in any second and subsequent zones, the pasta dough is pliable and has the greatest amount of moisture available for conversion to steam for matrix expansion within the pieces of pasta. It has been observed, however, that a very high degree of matrix expansion (very low product density) can result in fragile pasta with a soft texture and poor product integrity. On the other hand, too little expansion (high product density) will decrease porosity, increase preparation time requirements and reduce cooked yield. Some cooking of the dough can also take place in the first toasting zone. After the first and second toasting zones, subsequent toasting zones can be utilized to further reduce moisture content.

Toasting temperatures in the toasting zones are kept in a range from about 180° F. to about 350° F. with the preferred range being from about 210° F. to about 310° F.

Air velocity during toasting has been found to be important to drying uniformity and product uniformity. Effective air velocities employed are from about 150 to 800 feet per minute with the preferred range being from about 250 to 800 feet per minute. Airflow velocities are varied depending on the product shape, thickness and the desired final moisture content of the pasta to attain desired product uniformity and rate of moisture loss.

Following toasting, the toasted pasta is removed from the toaster and cooled to ambient temperature by conventional means such as by using a forced air cooler.

As noted above, the products of the invention are partially pre-cooked, having a degree of gelatinization from about 15% to about 80%, preferably from about 25% to about 75%. In order to determine the degree of gelatinization of a pasta product, the total heat absorbed during the gelatinization of a weighed portion of pasta in sufficient water is measured by a differential scanning calorimeter (DSC).

To accomplish this, at least 10 grams of the product is finely ground and 10 milligrams (mg) of this is weighed into the bottom portion of a special stainless steel capsule which fits in the instrument. The weighing is done on a microbalance accurate to at least 0.01 mg. Twenty mg of water is then injected into the capsule bottom on top of the pasta and the total weight of the capsule contents obtained. The lid of the capsule, which is fitted with a neoprene "O" ring, is placed on the capsule bottom as a cover. Pressure is applied to form a hermetic seal which will prevent the loss of moisture during heating. The capsule is placed in the sample well of the DSC instrument chamber and a sealed empty capsule is placed in the reference well. The chamber is uniformly heated at a constant rate and the difference in the heat absorbed by the sample over the blank is determined in joules/gram for a peak in a region of the resulting thermogram near 70° C. This result is subtracted from the value similarly determined for a sample of the raw wheat component (such as semolina or durum wheat) utilized in making the product. Since the two values represent how much heat was required to gelatinize the remaining ungelatinized starch present in the individual samples, the difference expressed as a % is the level to which the product has already been gelatinized.

The products of the invention also exhibit superior cooked yield (sometimes referred to the art simply as yield or % hydration). In order to determine cooked yield, optimum cook time must be measured and this was done using the chewing method and the squeeze method for each sample and using the results of the method that gave the shortest cook time.

According to the chewing method, 25 grams of dry pasta is cooked in a beaker containing 300 ml of boiling distilled water. A timer is started and pieces of cooked pasta are removed from the cooking water at 30 second intervals. The pieces are chewed through between molar teeth. The optimum cook time is the time when no hard core is detected for the first time.

According to the squeeze method, 25 g of the same dry pasta formulation is cooked in a beaker containing 300 ml of boiling distilled water. A timer is started and pieces of cooked pasta are removed from the cooking water at 30 second intervals and placed between two pieces of clear plastic. The optimum cook time is the time when a white center core of cooked pasta disappears for the first time. (See Method 16-50, AACC in the 1995 Edition of Methods of the American Association of Cereal Chemists, 3340 Pilot Knob Road, St. Paul, Minn. 55121 U.S.A.).

Cooked yield then is determined by adding 10 grams of the same dry pasta formulation to 300 grams of boiling distilled water and cooking for the optimum cook time as determined above. Then the cooked pasta is drained on a sieve for 5 minutes and weighed. The cooked yield of the pasta is reported as a percentage of the initial dry pasta weight of 10 grams. The cooked yield of the pasta of the invention is from about 315% to about 450%, preferably from about 330% to about 425%.

Variations on the method of making the pasta product include the use of steam prior to the toasting process to modify product attributes by increasing product integrity, increasing resistance to "checking or cracking", reducing starch loss, increasing pasta firmness and increasing tolerance to over cooking. This can be achieved by introducing food grade steam into the same apparatus that otherwise would be used for toasting. Steam functions to precook starch and to denature protein on the surface of the pasta products. This process modification significantly strengthens the protein-starch matrix. The degree of starch gelatinization and protein insolubility can be used as indicators of the type and extent of processing, bearing in mind that the product of the invention is not fully pre-cooked.

Steaming also increases our ability to design products with the product attributes indicated. These attributes are especially important in that they improve product performance in many convenience oriented preparation methods such as microwave, boiling water pour-over, and stove-top preparations.

Further improvements in preparation time can be achieved by the addition of salt. The addition of up to about 3% salt based on the weight of the farinaceous material (such as wheat, corn, soy flours, semolina, farina and the like) also improves hydration by creating voids within the structure of the pasta and noodles after the salt dissolves during cooking. Highly soluble salts dissolve leaving fine trails or voids in the pasta structure that facilitates water penetration during cooking. For example, a 2% salt level improved preparation time during one microwave application to 4 to 4.5 minutes when compared to a 5 minute microwave preparation time without salt.

Manipulating the type, quality and quantity of protein in the extruded dough modifies pasta product performance. The addition of protein sources, such as vital wheat gluten, egg proteins, soy and other food grade protein sources in amounts from about 0.25% to about 10% can be used to modify the pasta product attributes, with the typical range being from about 0.5% to 5.0%. Protein sources are especially useful when farinaceous materials are utilized that are low in protein content or in instances where the native protein functionality is lacking. Added proteins can be used to modify texture, increase firmness, reduce starch loss, improve tolerance to overcooking and maintain product integrity during rigorous preparation procedures that require frequent stirring.

By controlling the dough moisture, toast conditions and modifying the protein matrix it is possible to design the pasta product texture and hydration characteristics to suit specific preparation methods. Under the present invention, it is now possible to "design pasta" that has the characteristics of reduced cooking time and to create the desired pasta texture.

The method of the invention can be applied to any shape of pasta. Pasta can be made in any short and long good shape and may be of conventional or thin wall thickness. Wall thicknesses are chosen as a function of the type of preparation method and preparation time requirements needed.

In a preferred embodiment of the invention, a sauce is provided in combination with the pasta and the bowl of the invention and a new granular product is employed to make the sauce. With this embodiment the consumer adds water, gently stirs, heats in a microwave oven to cook and hydrate and then gently stirs again before eating. It is not necessary to interrupt cooking to stir. The granular product tends not to form clumps when water or milk is added and requires minimal stirring.

Sauces according to the invention can be made in a broad variety of flavors and textures, as long as the principles of the invention are followed as to processing conditions and the use of a second binder which provides a granulated product having the desired hydrophobic and hydrophilic characteristics. As described above, the desired hydrophobic and hydrophilic characteristics means the granular product does not tend to form clumps when water or milk at a temperature from about 5° C. up to about 100° C. is added. Stirring is not required during cooking and minimal stirring is required before and after cooking to obtain a uniform homogenous sauce. In normal use, water or milk from the refrigerator at a temperature from about 5° C. to about 15° C. or ambient water at a temperature from about 15–30° C. is employed and the granular product does not tend to form clumps in this temperature range from about 5° to about 30° C.

Granule size is important to achieve the objectives of the sauce of the invention because too many fine particles causes clumps and too many large particles increases the time required for hydration. A few particles that are too big or too small can be tolerated, however, as long as more than about 90%, preferably more than about 98%, have a particle size in a range from about 1000 microns to about 175 microns. This means that more than about 90%, preferably more than about 98% of the particles, by weight, pass through a USS #18 mesh sieve and are retained on a USS #80 mesh sieve.

Various ingredients can be used to make the granular product of the invention depending upon the desired flavor and texture of the sauce or soup to be prepared when the granules are hydrated. Some of these ingredients may have their own hydrophilic or hydrophobic characteristics and this can affect the composition of the second binder and the amount of second binder required to obtain granules having the desired characteristics. Accordingly, while an emulsifier is always required as an ingredient of the second binder, the other ingredients can be, for example, water if the granules do not need any additional ingredients to impart hydrophobic characteristics. This easily can be determined by one skilled in the art based on the guidance provided herein and the known characteristics of ingredients of the granular product. Small scale routine experiments can be conducted to optimize the hydrophobic and hydrophilic characteristics of the granular product.

The granular product of the invention is made by first preparing a dry mix of desired ingredients with from about 2% to about 55%, preferably from about 18% to about 35%, fat or fat substitutes (the percentages being based on total weight of the end product, i.e., the granular product of the invention) or a combination thereof. Suitable fats are commercially available, food grade, fat powders. The desired ingredients can include crystalline ingredients such as sugar, salt, citric acid and substitutes therefor; dairy ingredients such as dry milk, cheeses, cream powders and the like; spices, natural and artificial flavors, thickening agents such as starches (native, modified, waxy, etc.) and vegetable gums and the like and any combination of the foregoing.

A mixing vessel such as a high shear or fluid bed mixer is used to make a dry mixture by admixing the fat component with all of the remaining ingredients except for the binders and heat sensitive ingredients (i.e. natural and artificial flavors, spices and protein compounds).

The dry mixture is heated to about the drop point of the fat component, i.e. to the melting point or a temperature up to about 3° C. higher than the melting point, and then it is sprayed with a first binder solution to make a first particulate composition.

Forming particulates with the first binder solution is accomplished by spraying through a nozzle during mixing using conventional vessels for this purpose such as a high shear mixer or a bed mixer. Suitable high shear mixers include the continuous Schugi mixers available from Hosokawa Bepex Corporation, Minneapolis, Minn. U.S.A. and the Zanchetta mixer available from Zanchetta & C.s.r.L., Lucca, Italy. Suitable fluidized bed mixers are the Glatt fluidized bed available from Glatt Air Techniques, Inc., Ramsey, N.J., U.S.A. and the Niro Aeromatic available from Niro Aeromatic, Boehum, Germany. These vessels are known in the art and described in the literature. For example, use of the fluidized bed for granulating and drying is described in FLAVOR ENCAPSULATION, Chapter 17 by Jones, David M., *Controlling Particle Size and Release Properties*, pages 158–176, Copyright 1988, American Chemical Society, Washington, D.C., ACS Symposium Series 370, edited by Risch, Sara J. and Reineccius, Gary A.

The first binder is water or an aqueous solution which can contain as ingredients from about 0% to about 35% of soluble starch (e.g., any soluble modified food starch), 5–20 dextrose equivalent ("D.E.") maltodextrin, dextrose, sugar (sucrose) or salt or any combination of two or more of such ingredients.

The amount of the first binder composition employed, including the water, is from about 1% to about 50%, preferably from about 10% to about 30% by weight of first binder based on total weight of the granular product of the invention.

As an example of the invention, when a fluidized bed is used to spray the first binder on the dry mixture, the binder is sprayed through a nozzle in the fluidized bed as the dry mixture is fluidized in the vessel. The orifices in the nozzle are sized so that droplets of the desired size are formed and this determines the particle size of the first particulate composition. The temperature in the fluidized bed is maintained at from about 20° C. to about 50° C. depending upon the melting point of the fat component, the objective being to keep the temperature close to the drop point to enhance binding.

The first particulate composition is dried to a moisture content of from about 2% to about 6% at a temperature from about 35° C. to about 60° C., preferably using fluidized drying or drying under a vacuum to make a dried first particulate composition.

Using cool air or a cold jacketed mixer, the dried first particulate composition is cooled to ambient temperature or from about 15° C. to about 40° C. Then the heat sensitive ingredients such as natural and artificial flavors, spices and protein compounds are admixed with said particulate composition. This is generally done in mixing vessel such as a fluid bed or impeller/chopper for from about 1–3 minutes. Following mixing, a second binder composition is coated on the particles by spraying through a nozzle in a fluidized bed or a high shear mixer, in the same manner as the application of the first binder composition.

The second binder composition is a solution comprised of two components. The first component is comprised of a food grade oil and/or a binder such as the first binder composition defined herein. Suitable food grade oils are those having a low linolenic acid content such as corn oil, cottonseed oil, peanut oil, olive oil and the like. Higher linolenic acid oils such as soybean oil are not recommended because they can become rancid quickly when they are sprayed. Suitable first binder compositions are all of those identified herein and they can be the same or different than the first binder composition used to prepare the first particulate composition of the invention. The second component of the second binder composition is a food grade emulsifier such as lecithin, mono or diglycerides or combinations thereof. The ratio of the first component to the second component is from about 1:0.25 to about 1:1 and the amount employed is from about 0.2% to about 2.5% based on total weight of the end product (i.e., the granular product of the invention). After the particulate composition has been coated with the second binder, it is a granulated product ready for use to make a sauce or a soup according to the invention. In some cases, if too many oversize granules are produced, all of the product is sieved through a USS #10 sieve before use according to the invention. Further sieving may be done, if necessary, but no sieving should be needed once the processing conditions have been optimized.

When the product of the invention containing the sauce mix is prepared for consumption by the consumer, water is added to the fill line of the container, the contents are stirred gently and the product is placed in a microwave oven to be cooked, generally for about 5 minutes. During cooking, the product starts to boil after about 2.5 minutes. At the time when the product reaches the boiling point, especially on the side of the bowl, there is a sufficient amount of starch that leaches from the pasta along with the fat and other compounds from the sauce mix to form a thin liquid film which forms a foam. The foam in this case is a dispersion that is a suspension and/or emulsion. This dispersion, depending upon the contents of the product, may have varying particle size and composition, and hence varying surface tension.

In this embodiment, where about 5 minutes cooking time is needed to allow the pasta and the sauce to be cooked, it is desirable to avoid foaming, splashing and boil over. Foam that forms during cooking helps the product to cook properly because it effectively raises the fluid level in the bowl to cover the pasta and cook it uniformly. Without the foam, the pasta in the top of the bowl will not be cooked. Accordingly, applicants needed to control the foam, minimize the splashing and prevent the boil over so that stirring during cooking could be eliminated for convenience purposes.

Applicants have discovered that the presence of surfactants such as the mono & di glycerides employed in applicants' fat containing sauce mixes cause less splashing/foaming while permitting sufficient foaming to cook the product. Even though, the surfactants are considered as foam stabilizers, in this application when they are used in a small concentration they control the foaming process during cooking. Mono & di glycerides are self-dispersible by virtue of the presence of hydrophilic-lipophilic groups in the same molecule that can be highly effective antifoam agents. The addition of lecithin as a wetting agent and as a surfactant in this system also plays a role in controlling foam/splashing and preventing boil over.

Of interest in this regard is U.S Pat. No. 4,185,122. The patent provides a method of preventing or eliminating the foaming of polymeric dye-containing aqueous solutions, particularly soft drink compositions, by use of glycerol monooleate, glycerol dioleate or a mixture thereof. "Glycerol monooleate (GMO) and glycerol mono- and dioleate (GMDO) are food grade additives usually considered to be emulsifiers and solvents. They are described as effective at low concentrations when used as defoamers for certain aqueous solutions. This is distinguished from the present invention where foam/splashing and boil over is controlled as discussed above.

EXAMPLES

Example 1

A disposable bowl was made by injection molding a blend of polypropylene and high density polyethylene. The inside diameter at the end opening was 110 mm and the inside diameter at the bottom of the side panel (where the side panel 18 meets radius 17 in FIG. 3) in a plane normal to the central axis was 95 mm. The interior height of the bowl from the bottom panel to the end opening was 75 mm. The push-up had an outside diameter (i.e., inside the bowl) of 45 mm and a height from the lowest point inside the bottom of the bowl of 10 mm. The bowl was filled with liquid to a fill line located 25 mm below the end opening and subjected to microwave heating. The liquid boiled vigorously without boiling over.

Example 2

A wheat flour dough mix made of 77% of semolina and 23% of water was fed to a Demaco laboratory pasta press, fitted with a rotini die and a cutting knife, which extruded formed pieces of fresh pasta (32% moisture) with a pasta thickness of 0.027". Unlike the typical pasta extrusion process, no vacuum was used during pasta extrusion. The extruded pieces as formed were transferred to a forced air cooler fitted with an air blower to remove the surface moisture of the freshly extruded pasta and to prevent the pasta pieces from sticking together during subsequent processing steps. The surface dried pasta was transferred to a laboratory Proctor & Schwartz toaster (a "P&S" toaster available from Proctor & Schwartz, 251 Gibraltar Road, Horsham, Pa. 19044 U.S.A.) and toasted at 298° F. for 2.25 min. with an air velocity setting of 250 ft/min. Then, the toasted pasta was removed from the toaster and cooled to ambient temperature by using a forced air cooler. Unlike typical dried pasta, the toasted pasta had an expanded internal structure with many expanded air cells, which made the toasted pasta cook faster than regular pasta while maintaining typical pasta texture under regular cooking in boiling water and microwave cooking. The density of the toasted pasta was 0.78 g/cc, degree of gelatinization was 59.3% and cooked yield was 348% at the optimum cook time of 3 minutes.

Example 3

The same dough formulation was extruded and air dried as in Example 2. The surface dried pasta was transferred to a laboratory P&S toaster and toasted at 260° F. for 14 min. with an air velocity setting of 250 ft/min. Then, the toasted pasta was removed from the toaster and cooled to ambient temperature by using the forced air cooler. Unlike typical dried pasta, the toasted pasta had an expanded internal structure with many expanded air cells, which made the toasted pasta cook faster than regular pasta while retaining the texture of typical pasta under various types of cooking conditions (regular cooking in boiling water and microwave cooking). The density of the toasted pasta was 0.95 g/cc, degree of gelatinization was 24.1% and the cooked yield was 337% at the optimum cook time of 4 minutes.

Example 4

The same dough formulation was extruded and air dried as in Example 2. The surface dried pasta was transferred to a laboratory P&S toaster and toasted at 285° F. for 5 min. with an air velocity setting of 250 ft/min. Then, the toasted pasta was removed from the toaster and cooled to ambient temperature by using the forced air cooler. Unlike typical dried pasta, the toasted pasta had an expanded internal structure with many expanded air cells, which made the toasted pasta cook faster while retaining typical pasta texture under various types of cooking conditions (regular cooking in boiling water and microwave cooking). The density of the toasted pasta was 0.83 g/cc, degree of gelatinization was 40.6% and cooked yield was 371% at the optimum cook time of 3.5 minutes.

Example 5

A wheat flour dough mix made of 76% of semolina, 23% of water and 1% of table salt was fed to a Demaco laboratory pasta press, fitted with a rotini die and a cutting knife, which extruded formed pieces of fresh pasta (32% moisture) with a pasta thickness of 0.027". No vacuum was used during pasta extrusion. The extruded pieces as formed were transferred to a forced air cooler fitted with an air blower to remove surface moisture of the freshly extruded pasta to prevent pasta pieces from sticking together during subsequent processing steps. The surface dried pasta was transferred to a laboratory P&S toaster and toasted at 298° F. for 2.25 min. with an air velocity setting of 250 ft/min. Then, the toasted pasta was removed from toaster and cooled to ambient temperature by using the forced air cooler. This product cooked even faster because of the expanded internal structure and the presence of salt which helps cooking water penetrate into the internal structure under various types of cooking conditions (regular cooking in boiling water and microwave cooking). The density of the toasted pasta was 0.81 g/cc, degree of gelatinization was 46.8% and cooked yield was 343% at the optimum cook time of 2.25 minutes.

Example 6

A wheat flour dough mix made of 78% of semolina and 22% of water was fed to a Buhler pasta press model TPAE, fitted with a rotini pasta die and a cutting knife, which extruded formed pieces of fresh pasta (31%moisture) with pasta thickness of 0.027". No vacuum was used during pasta extrusion. The extruded pasta as formed was transferred pneumatically to a Buhler fluid bed toaster, model DNTW, and was toasted at 277° F. for 6 min. with an air velocity setting of 670 ft/min. Then, the toasted pasta was cooled to ambient temperature in the cooling zone of the toaster. Unlike typical dried pasta, the toasted pasta had an expanded internal structure with many small air cells, which made the toasted pasta cook faster than regular pasta while maintaining a typical pasta texture under various types of cooking conditions (regular cooking in boiling water and microwave cooking). The density of the toasted pasta was 0.83 g/cc, degree of gelatinization was 60.3% and cooked yield was 377% at the optimum cook time of 2.5 minutes.

Example 7

The same pasta formulation as used in Example 6 was extruded under the same conditions and transferred pneumatically to a Buhler fluid bed toaster, model DNTW. The pasta was toasted at 327° F. for 2 min. with an air velocity setting of 670 ft/min. for the 1st zone and at 277° F. for 2 min with the same air velocity for the 2nd zone. Then, the toasted pasta was cooled to ambient temperature in the cooling zone of the toaster. Unlike typical dried pasta, the toasted pasta had an expanded internal structure with many expanded air cells, which made the toasted pasta cook faster than regular pasta while retaining typical pasta texture under various types of cooking conditions (regular cooking in boiling water and microwave cooking). The density of the toasted pasta was 0.76 g/cc, degree of gelatinization was 71.2% and cooked yield was 389% at the optimum cook time of 3 minutes.

Example 8

The same pasta formulation as used in Example 7 was extruded under the same conditions and transferred pneumatically to a Buhler fluid bed toaster, model DNTW, where the pasta was toasted at 212° F. for 4 min. with an air velocity setting of 670 ft/min. for the 1st zone and at 284° F. for 4 min. with the same air velocity for the 2nd zone. Then the toasted pasta was cooled to ambient temperature in the cooling zone of the toaster. Unlike typical dried pasta, the toasted pasta had an expanded internal structure with small air cells, which made the toasted pasta cook faster than regular pasta with typical pasta texture under various types of cooking conditions (regular cooking in boiling water and microwave cooking). The density of the toasted pasta was 0.99 g/cc, degree of gelatinization was 31.9% and cooked yield was 383% at the optimum cook time of 3 minutes.

Example 9

The same dough formulation was extruded and air dried as in Example 2. The surface dried pasta was transferred to a laboratory P&S toaster conditioned with steam by injecting 15 lbs of steam into the toaster. The pasta was heated at 298° F. for 1.0 min with steam and then toasted for 1.25 min without steam by disconnecting the steam line. Then the toasted pasta was removed from the toaster and cooled to ambient temperature by using the forced air cooler. This product had the same expanded internal structure as toasted pasta that was not steam treated but it had better structural integrity than toasted pasta that was not steam treated. It also had the same textural and cook time characteristics as the toasted pasta that was not steam treated. The toasted pasta had a density of 0.95 g/cc, a degree of gelatinization of 56.5% and a cooked yield of 365% at the optimum cook time of 3 minutes.

Example 10

A wheat flour dough mix made of 73.6% of semolina, 23% of water, 1.8% of wheat gluten and 1.6% of powered egg white was fed to a Demaco laboratory pasta press, fitted with a rotini die and a cutting knife, which extruded formed pieces of fresh pasta (32% moisture) with a pasta thickness of 0.027". No vacuum was used during pasta extrusion. The extruded pieces as formed were transferred to a forced air cooler fitted with an air blower to remove surface moisture of the freshly extruded pasta to prevent pasta pieces from sticking together during subsequent processing steps. The surface dried pasta was transferred to a laboratory P&S toaster and toasted at 298° F. for 2.25 min with an air velocity setting of 250 ft/min. The toasted pasta then was removed from the toaster and cooled to ambient temperature by using the forced air cooler. This product had the expanded internal structure observed in the other toasted pastas of the invention but it required slightly longer cook time than the toasted pastas with no added wheat gluten and egg white. The product had firm textural bite characteristics and excellent structural integrity. The toasted pasta had a density of 0.85 g/cc, a degree of gelatinization of 61.4% and a cooked yield of 317% at the optimum cook time of 4.5 minutes.

Example 11

A wheat flour dough mix made of 77% of semolina and 23% of water was fed to a plant scale Buhler press, model TPR, fitted with a rotini die and a cutting knife, which extruded formed pieces of fresh pasta (32% moisture) with a pasta thickness of 0.027". No vacuum was used during pasta extrusion. The extruded pasta as formed were transferred to a production scale P&S belt type toaster with 3 heating zones and 1 cooling zone by a shaker conveyor fitted with an air blower to remove surface moisture of the freshly extruded pasta. Then the pasta was toasted for 2 min. at 300° F. for zone 1, for 2 min at 266° F. for zone 2, for 2 min at 220° F. for zone 3 and was cooled for 2 min with ambient air. Unlike typical dried pasta, the toasted pasta had an expanded internal structure with many expanded air cells, which made the toasted pasta cook faster while retaining typical pasta texture under various types of cooking conditions (regular cooking in boiling water and microwave cooking). The toasted pasta had a density of 0.75 g/cc, a degree of gelatinization of 68.2% and a cooked yield of 398% at the optimum cook time of 3 minutes.

Comparative Example 1—Pasta

A dough mix of 45% corn flour, 25% soy flour and 30% hard wheat flour was dry blended in a Hobart mixer. Water was admixed with the dry blend to make a dough having 35% water. A DeMaco pasta press, fitted with a rotini die and a cutting knife, was used to extrude pieces of fresh pasta. A vacuum of 17 inches Hg was used during extrusion.

Figure 8:
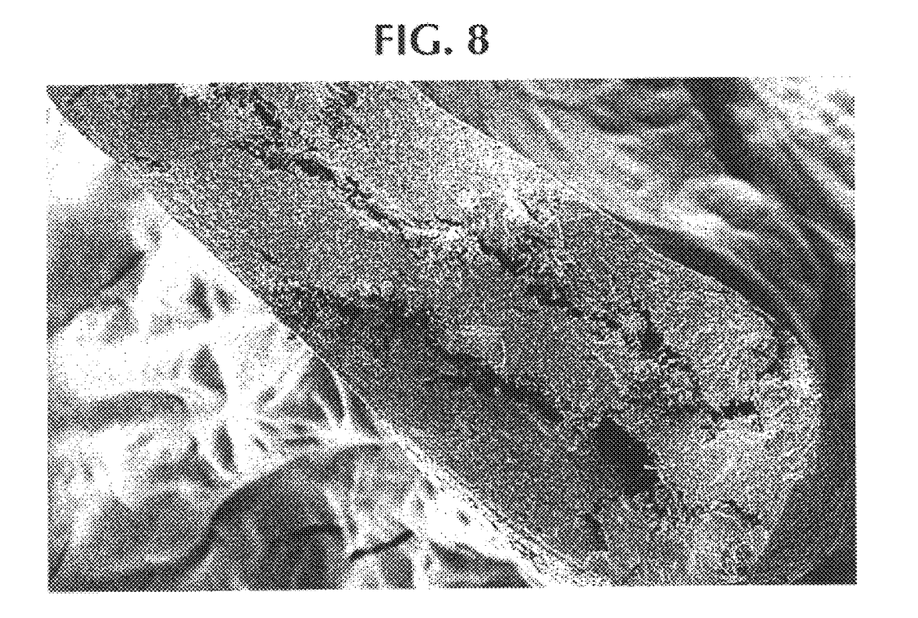
FIG. 8 is a SEM photomicrograph of a pasta made according to U.S. Pat. No. 3,615,677, Comparative Example 1 herein, and dried for 15 minutes at 225° F.

A first portion of the pasta was toasted at 225° F. for 15 minutes and a photomicrograph was taken of a section of one piece. This photomicrograph is FIG. 8.

Figure 9:
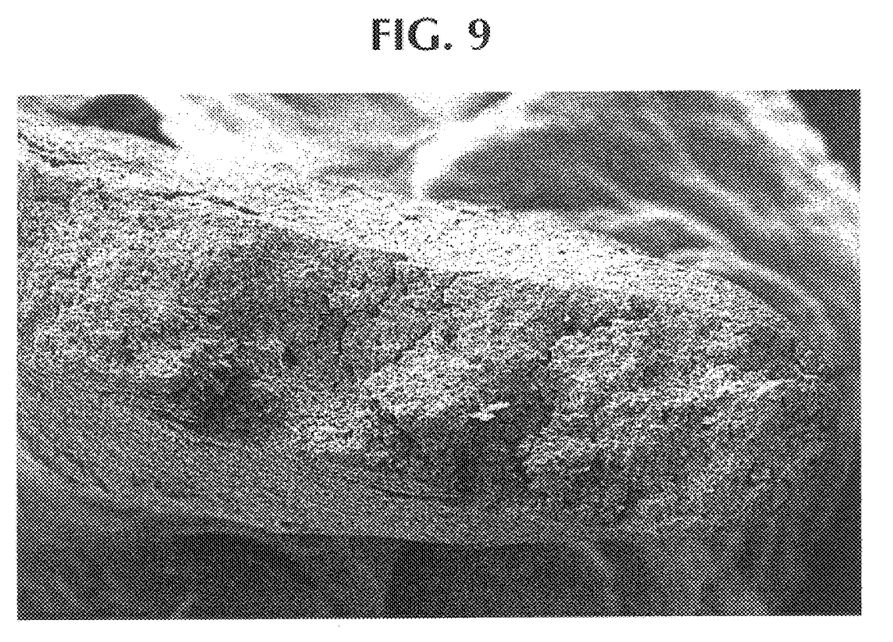
FIG. 9 is a SEM photomicrograph of the same pasta as made for FIG. 2, but with drying for 3 minutes at 300° F.

A second portion of the pasta was toasted at 300° F. for 3 minutes and a photomicrograph was taken of a section of one piece. This photomicrograph is FIG. 9.

The pasta dough was well mixed but it had a lumpy texture. The pasta product had poor structural integrity. It also had a soft mushy texture when it was hydrated and a harsh bitter soy flavor.

Comparative Example 2—Pasta

Figure 10:
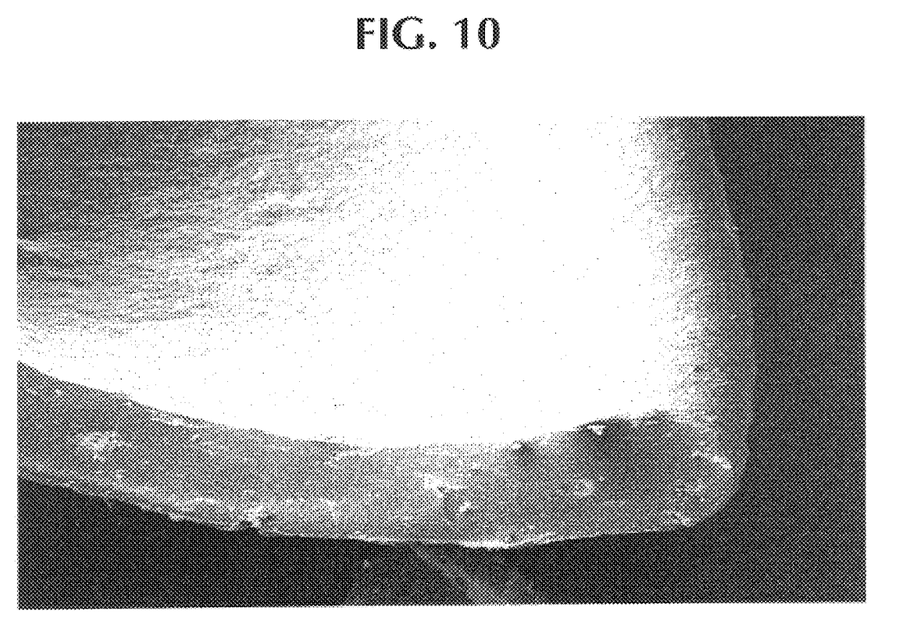
FIG. 10 is a SEM photomicrograph of a commercially available pasta product that is said to rehydrate quickly.

A sample of a commercially available thin-walled pasta product that rehydrates quickly, Instant Pasta-Spirals from N. V. Establ. Joseph Soubry S. A., Ardooisesteenweg 110, 8800 Roeselare, Belgium, was prepared for SEM analysis as set forth above. A photomicrograph of the sample is shown in FIG. 10, illustrating the dense nature of the product.

Comparing the photomicrographs of FIGS. 7–10, none of the comparative products (FIGS. 8–10) exhibit the open internal porous structure of the pasta of the present invention, FIG. 7.

Examples 12–13

The following ingredients were employed to make sauces for pasta and the amounts are expressed by weight in pounds.

| Base Ingredients | Example 12 | Example 13 |
| --- | --- | --- |
| Fat Powder | 26.120 | 27.070 |
| Tomato Powder | 0.000 | 0.000 |
| Sugar | 0.000 | 0.000 |
| Starch (Melojel) | 20.353 | 17.080 |
| Maltrin M150 | 4.260 | 5.000 |
| Salt | 7.660 | 7.650 |
| Wheat Flour (dried) | 3.510 | 2.600 |
| Mono and Di Glycerides | 0.451 | 0.450 |
| Flavoring Components | 34.864 | 32.051 |
| Heat Sensitive Ingredients | 2.782 | 8.099 |
| TOTAL | 100.000 | 100.000 |
| First Binder | 4.400 | 3.000 |
| Second Binder | 1.420 | 1.420 |

The fat powder employed was NDX 112-V available from Kerry Food Ingredients, Beloit, Wis., U.S.A. The powder contains 75% partially hydrogenated soybean oil, sodium and calcium caseinate and mono and di glycerides.

The tomato powder was Hot Break or Cold Break tomato powder, or a combination thereof, available from McCormick, Baltimore, Md., U.S.A.

The sugar was sucrose.

The starch was Melojel, a native corn starch available from National Starch, Woodbridge, N.J., U.S.A.

The dried wheat flour was an enzyme inactivated wheat flour from Bestfoods, Heilbronn, Germany.

The mono and di glycerides was Atmos 150 from EDC Chemicals, Humko Chemical Division, Witco Corp., Memphis, Tenn., U.S.A.

The flavoring components were spice extracts, cheese powders and the like which are not heat sensitive.

The heat sensitive ingredients were natural and artificial flavors and spices.

The first binder was a 10% aqueous solution of Maltrin M150 and the amount shown is expressed on a dry basis.

The second binder was corn oil and lecithin in a 2:1 ratio.

A Glatt Powder Coater/Granulator/Dryer Model GPCG-60 (a 60 kilogram fluidized bed apparatus, hereinafter the "apparatus") was used to produce 100 pound batches of each of the foregoing sauces.

The bowl of the apparatus was charged with the base ingredients and blended for 2 minutes to make a dry blend. The temperature of the dry blend was about 30–40° C.

The dry blend was fluidized and an aqueous solution of 10% maltodextrin M 150 (available from Grain Processing Corp., Muscatine, Iowa, U.S.A. as Maltrin M150 and having a D.E. of 15) was sprayed through the nozzle of the apparatus at a concentration of 3–4.5% dry basis based on total weight of the end product to make a first particulate composition. Atomization pressure at the nozzle was 2.5–3.0 Bar and the granulation was continued for 20–35 minutes depending on the formula, product composition and batch size, as would be apparent to one skilled in the art. The nozzle employed was a 3.0 millimeter (mm) orifice nozzle provided by Glatt. The temperature of the first particulate composition was from 37° C.–40° C.

The first particulate composition was dried in the apparatus for 3–6 minutes to a maximum product temperature of 50° C. and a moisture content of 3.55–4.26%. The composition then was cooled to a temperature of about 40° C. using cool air in the apparatus.

The heat sensitive ingredients then were added to the bowl and blended for 2 minutes. Cooling was continued to maintain the temperature below about 40° C.

The particles were again fluidized and a solution of corn oil and lecithin, in a ratio of 2:1 by weight, was sprayed through the nozzle at a concentration of 1.3–1.47%. Atomization pressure was at 5.2 Bar for 1.5–2 minutes and the nozzle employed was a 1.8 mm orifice nozzle provided by Glatt. The discharged agglomerated product was at a temperature from 31–38° C.

In a scaled-up process, a Glatt Powder Coater/Granulator/Dryer Model GPCG-500 was used to produce 1,000 pound batches of the same product. Granulation and blending times were sufficiently increased to obtain the same granulation and blending characteristics as in the smaller batch size process and more nozzles of the same size were employed to handle the increased throughput. All of the processing parameters were otherwise the same and the characteristics of the products were the same.

Examples 14–15

As in Examples 12 and 13, the following ingredients were employed and they were processed under the same conditions to make a granular product.

| Base Ingredients | Example 14 | Example 15 |
|---|---|---|
| Fat Powder | 33.370 | 24.950 |
| Tomato Powder | 0.000 | 0.000 |
| Sugar | 0.000 | 0.000 |
| Starch (Melojel) | 18.880 | 20.450 |
| Maltrin M150 | 4.050 | 3.880 |
| Salt | 6.430 | 2.570 |
| Wheat Flour (dried) | 2.520 | 3.720 |
| Mono and Di Glycerides | 0.460 | 0.357 |
| Flavoring Components | 27.535 | 36.962 |
| Heat Sensitive Ingredients | 6.755 | 7.111 |
| TOTAL | 100.000 | 100.000 |
| First Binder | 3.700 | 3.000 |
| Second Binder | 1.440 | 1.360 |

Examples 16–17

As in Examples 12 and 13, the following ingredients were employed and they were processed under the same conditions to make a granular product.

| Base Ingredients | Example 16 | Example 17 |
|---|---|---|
| Fat Powder | 22.780 | 18.350 |
| Tomato Powder | 0.000 | 30.900 |
| Sugar | 0.000 | 5.410 |
| Starch (Melojel) | 28.060 | 11.590 |
| Maltrin M150 | 3.510 | 8.130 |
| Salt | 5.570 | 8.890 |
| Wheat Flour (dried) | 5.100 | 1.930 |
| Mono and Di Glycerides | 0.510 | 0.154 |
| Flavoring Components | 21.730 | 9.300 |
| Heat Sensitive Ingredients | 12.740 | 5.346 |
| TOTAL | 100.000 | 100.000 |
| First Binder | 4.400 | 3.000 |
| Second Binder | 1.420 | 1.470 |

Examples 18–19

As in Examples 12 and 13, the following ingredients were employed and they were processed under the same conditions to make a granular product.

| Base Ingredients | Example 18 | Example 19 |
|---|---|---|
| Fat Powder | 17.761 | 16.727 |
| Tomato Powder | 29.913 | 16.727 |
| Sugar | 5.240 | 4.460 |
| Starch (Melojel) | 11.220 | 16.850 |
| Maltrin M150 | 10.430 | 7.190 |
| Salt | 8.230 | 7.430 |
| Wheat Flour (dried) | 1.870 | 2.620 |
| Mono and Di Glycerides | 0.150 | 0.000 |
| Flavoring Components | 9.034 | 9.755 |
| Heat Sensitive Ingredients | 6.152 | 18.241 |
| TOTAL | 100.000 | 100.000 |
| First Binder | 3.000 | 3.600 |
| Second Binder | 1.420 | 1.420 |

ANALYTICAL RESULTS

The granular products of Examples 12–17 and 19 were analyzed to determine various characteristics. A Powder Characteristics Tester available from Hasokawa Micron Division, 10 Chatham Road, Summit, N.J. 07901 U.S.A. was used to test Bulk Density, Angle of Repose and Compressibility and other tests were conducted with other conventional laboratory instruments. The results were as follows:

|  | Example 12 | Example 13 |
|---|---|---|
| Flavor | Cheese-1 | Cheese-2 |
| Bulk Density |  |  |
| Aerated g/cc | 0.42 | 0.39 |
| Packed g/cc | 0.51 | 0.49 |
| Dynamic g/cc | 0.44 | 0.41 |
| Angle of Repose | 41.00 | 40.00 |
| Compressibility (%) | 17.60 | 20.40 |
| % Moisture | 3.93 | 4.05 |
| % Salt | 8. | 10.093 |
| Aw (water activity) | 0.348 | 0.319 |
| Granulation |  |  |
| (% on USS#) |  |  |
| 18 | 23.00 | 8.40 |
| 35 | 56.80 | 47.40 |
| 60 | 18.20 | 37.00 |
| 80 | 1.40 | 5.60 |
| 120 | 0.00 | 1.60 |
| 170 | 0.00 | 0.00 |
| Pan | 0.00 | 0.00 |
| Mechanical Stability | 99.40 | 100.00 |

|  | Example 14 | Example 15 |
|---|---|---|
| Flavor | Cheese-3 | Chicken-1 |
| Bulk Density |  |  |
| Aerated g/cc | 0.40 | 0.39 |
| Packed g/cc | 0.52 | 0.50 |
| Dynamic g/cc | 0.43 | 0.41 |
| Angle of Repose | 44.00 | 39.00 |
| Compressibility (%) | 23.10 | 22.00 |
| % Moisture | 3.55 | 4.26 |
| % Salt | 8.53 | 10.016 |
| Aw (water activity) | 0.308 | 0.328 |
| Granulation |  |  |
| (% on USS#) |  |  |
| 18 | 17.00 | 2.60 |
| 35 | 52.40 | 48.20 |
| 60 | 23.80 | 34.20 |
| 80 | 5.20 | 4.80 |
| 120 | 1.00 | 0.40 |
| 170 | 0.00 | 0.00 |
| Pan | 0.00 | 0.00 |
| Mechanical Stability | 100.00 | 100.00 |

|  | Example 16 | Example 17 |
|---|---|---|
| Flavor | Chicken-2 | Tomato |
| Bulk Density |  |  |
| Aerated g/cc | 0.40 | 0.42 |
| Packed g/cc | 0.53 | .54 |
| Dynamic g/cc | 0.43 | 0.45 |
| Angle of Repose | 39.00 | 42.00 |
| Compressibility (%) | 24.50 | 22.20 |
| % Moisture | 3.96 | 4.06 |
| % Salt | 13.091 | 10.616 |
| Aw (water activity) | 0.279 | 0.327 |

-continued

|  | Example 16 | Example 17 |
|---|---|---|
| Granulation |  |  |
| (% on USS#) |  |  |
| 18 | 5.20 | 3.20 |
| 35 | 33.80 | 49.40 |
| 60 | 52.80 | 42.80 |
| 80 | 7.00 | 4.20 |
| 120 | 0.20 | 0.00 |
| 170 | 0.00 | 0.00 |
| Pan | 0.00 | 0.00 |
| Mechanical Stability | 99.00 | 100.00 |

|  | Example 19 |
|---|---|
| Flavor | Cheese-Tomato |
| Bulk Density |  |
| Aerated g/cc | 0.41 |
| Packed g/cc | 0.52 |
| Dynamic g/cc | 0.43 |
| Angle of Repose | 43.00 |
| Compressibility (%) | 21.10 |
| % Moisture | 4.09 |
| % Salt | 10.325 |
| Aw (water activity) | 0.319 |
| Granulation |  |
| (% on USS#) |  |
| 18 | 5.40 |
| 35 | 55.40 |
| 60 | 33.60 |
| 80 | 5.40 |
| 120 | 0.20 |
| 170 | 0.00 |
| Pan | 0.00 |
| Mechanical Stability | 100.00 |

Example 20

Sixty grams of wet toasted pasta made by the processes described in Example 11 and 30 g of sauce mix made by the processes described in Example 14 were put in the disposable bowl container described in Example 1. Then, 245 g of cold water was added to the container and stirred moderately. The product was cooked in a 700 watt microwave oven for 5 minutes at high power and then stirred gently. The resulting product had optimally cooked pasta with al dente texture and optimal sauce consistency for a hot snack product. No boil over was noticed during microwave cooking preparation.

What is claimed is:

1. A convenience food product comprising
a) a container that provides improved cooking properties in a microwave oven operating at microwave wavelength said container having a bottom portion essentially defining a torus in plan view, said torus having an effective circumference greater than a whole number of half wavelengths and an effective diameter, measured according to the dielectric constants of the contents of said container, such that the effective circumference of the torus is antiresonant, a side panel extending from said bottom portion and a cover receiving lip structure extending about and defining an end opening opposite the bottom portion, said side panel extending about a central axis through the bottom portion and end opening and comprising:

the bottom portion having a central segment and an outer segment, a substantially spherical section defining the central segment and having an apex on the central axis, the apex being disposed toward the end opening; said substantially spherical section having a substantially circular base intersecting a plane extending normal to the central axis, the outer segment having a base portion extending downward from said substantially circular base and away from the end opening along a first bottom radius and in a direction away from the central axis to a bottom panel, said bottom panel being substantially circular and extending away from the central axis along a plane extending substantially normal to the central axis to a second bottom radius and then extending upwardly along said second bottom radius away from said bottom portion and toward the end opening to the side panel;

the side panel having an exterior and having a continuous inner wall face intersecting a plane extending normal to the central axis along a substantially circular line and having a larger radius at the end opening than at the bottom portion whereby the inner wall face is tapered away from the central axis as the side panel extends upwardly from the bottom portion toward the end opening, said inner face having sufficient slope to permit the gradual dissipation of pressure built up from boiling the contents of said container to reduce the frequency of bumping, b) disposed in the container, at least a single serving of a quick cooking, partially pre-cooked pasta product having an expanded cell structure and a stabilized protein starch matrix with a porous internal structure and a cooked yield from about 315% to about 450%, a density from about 0.6 to about 1.05 g/cc and a degree of gelatinization from about 15% to about 80%, and c) disposed in the container, a hydratable granular food composition comprised of granules, said granules comrprising (i) a first particulate composition comprised of from about 2% to about 55% of a fat component, and compositions selected from the group consisting of crystalline ingredients, dairy ingredients, spice extracts and thickening agents and a first binder composition comprised of water or an aqueous solution of from 0% to about 35% of a composition selected from the group consisting of starch, 5–20 D.E. maltodextrin, dextrose, sucrose and salt, (ii) heat sensitive ingredients selected from the group consisting of natural flavors, artificial flavors, spices and protein compounds on said first particulate composition, and (iii) a second binder composition coated on said first particulate composition and heat sensitive ingredients comprising an emulsifier and, optionally, a composition selected from the group consisting of oil, water or an aqueous solution of from 0% to about 35% of a composition selected from the group consisting starch, 5–20 to D.E. maltodextrin, dextrose, sucrose and salt, the granules having a size distribution wherein more than about 90% of the granules have a size from about 1000 microns to about 175 microns.

2. The product of claim 1 wherein the pasta has a density from about 0.7 to about 1.00 g/cc.

3. The product of claim 1 wherein the fat component comprises a fat, a fat substitute or a fat and a fat substitute.

4. The product of claim 1 wherein the emulsifier is present in an amount from about 0.04% to about 2.5%.

5. The product of claim 1 wherein said granules have hydrophobic and hydrophilic characteristics whereby said granules do not tend to form clumps when cold or ambient water or milk at a temperature from about 5° C. to about 30° C. is added.

6. The product of claim 1 wherein the pasta has a cooked yield from about 330 to about 425.

7. The product claim 1 wherein the pasta has a degree of gelatinization from about 25% to about 75%.

8. The product of claim 1 wherein the pasta has a moisture content of less than about 13%.

9. The product of claim 8 wherein the pasta comprises a wheat flour dough.

10. The product of claim 8 wherein the pasta consists essentially of a wheat flour dough.

11. The product of claim 1 wherein the outer segment further comprises a frusto-conical portion disposed between the second bottom radius and the side panel, said second bottom radius extending to the frusto-conical portion and said frusto-conical portion extending upwardly and tapering away from the central axis to a third bottom radius, the third bottom radius extending upwardly to the side panel.

12. The product of claim 11 wherein the container has lower ribs radially disposed on the exterior of the frusto-conical portion.

13. The product of claim 12 wherein said lower ribs extend along the exterior of the third bottom radius.

14. The product of claim 13 wherein said lower ribs extend along the exterior of the second bottom radius.

15. The product of claim 12 having upper ribs radially disposed on the exterior of the side panel and extending downwardly from the cover receiving lip structure along a portion of said exterior.

16. The product of claim 15 wherein the container has a smooth labeling surface defined on the exterior of the side panel by the space between the upper ribs and the lower ribs.

17. The product of claim 1 wherein the container further comprises a bottom rib disposed on the exterior of said bottom panel, said bottom rib extending away from the end opening.

18. The product of claim 1 wherein the cover receiving lip structure is comprised of a substantially circular flange extending from the side panel away from the central axis in a plane normal to the central axis and further extending along a radius downwardly from the end opening to define a rolled outer edge.

19. The product of claim 18 wherein the container has upper ribs radially disposed on the exterior of the side panel and extending downwardly from the cover receiving lip structure along a portion of said exterior.

20. The product of claim 1 wherein the container has a curved bottom panel and the first and second bottom radii are the same or different.

21. The product of claim 20 wherein the curved bottom panel has a curve in the shape of a partial ellipse.

22. The product of claim 1 wherein said torus has an effective diameter greater than 60 mm and less than about 100 mm.

* * * * *